United States Patent
Kuribayashi

(10) Patent No.: US 6,317,396 B1
(45) Date of Patent: Nov. 13, 2001

(54) TRACKING ERROR GENERATING DEVICE

(75) Inventor: Hiroki Kuribayashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/417,362

(22) Filed: Oct. 13, 1999

(30) Foreign Application Priority Data

Oct. 13, 1998 (JP) .................................................. 10-290468

(51) Int. Cl.$^7$ ...................................................... G11B 7/00
(52) U.S. Cl. ..................................... 369/44.35; 369/53.31; 369/124.14
(58) Field of Search .............................. 369/44.27, 44.28, 369/44.29, 44.32, 44.35, 44.36, 44.41, 47.28, 47.17, 47.23, 53.12, 53.31, 53.33, 53.34, 124.14

(56) References Cited

U.S. PATENT DOCUMENTS 6,014,354 * 1/2000 Nomura et al. .................... 369/44.28
6,249,494 * 6/2001 Ueki .............................. 369/44.29 X

* cited by examiner

Primary Examiner—Paul W. Huber
(74) Attorney, Agent, or Firm—Sughrue, Mion, Zinn, Macpeak & Seas, PLLC

(57) ABSTRACT

A tracking error generating device which is capable of correctly detecting a phase difference and generating a normal tracking error even when recording marks (or spaces) on an optical disc have short lengths. The tracking error generating device employs, as evaluation target signals, respective output signals of light receiving elements or a signal generated by performing predetermined addition processing on the respective output signals of the light receiving elements, and has a determination circuit for determining whether the evaluation target signals each have a sufficiently large amplitude or time width to generate a tracking error signal, and a selective phase difference supply circuit for selectively supplying a phase difference signal to a smoothing circuit on the basis of a determination result of the determination circuit.

20 Claims, 14 Drawing Sheets

D1 D2 D3

WHEN s1 > b AND s3 < -b

D1 D2 D3

WHEN s1 < -b AND s3 > b

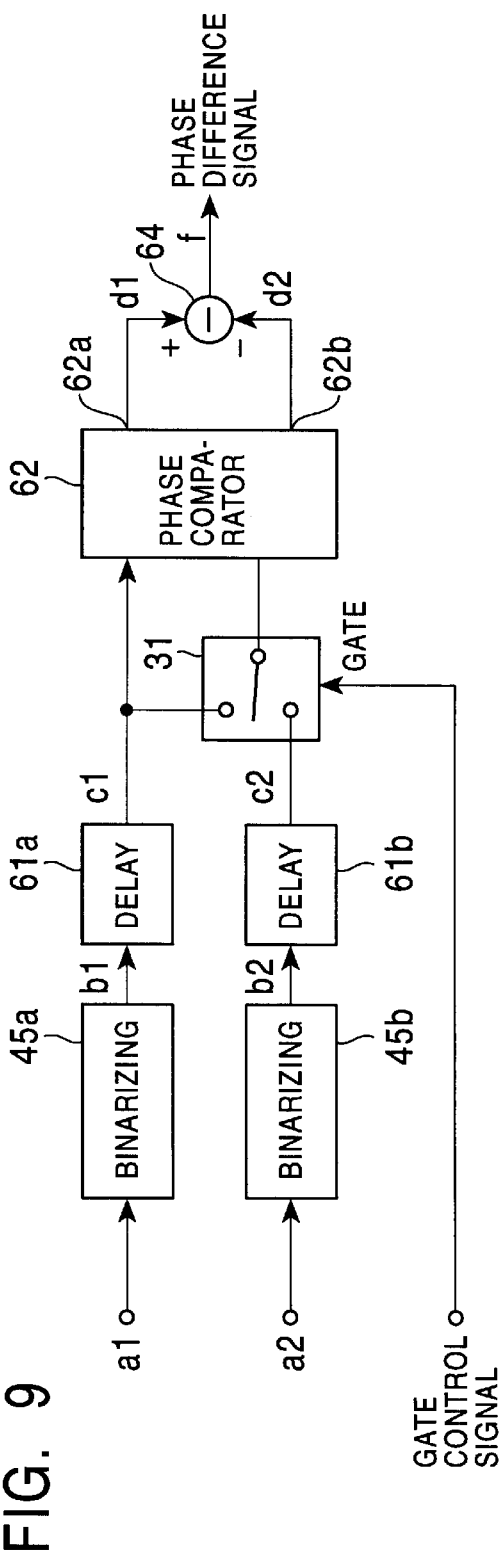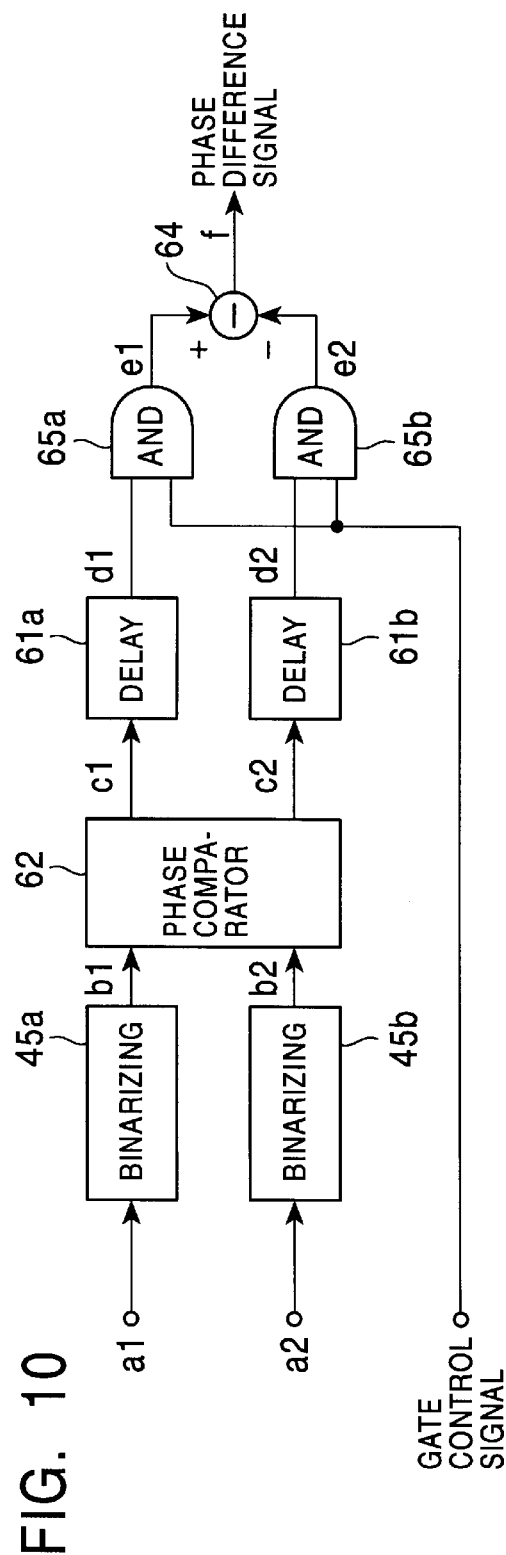

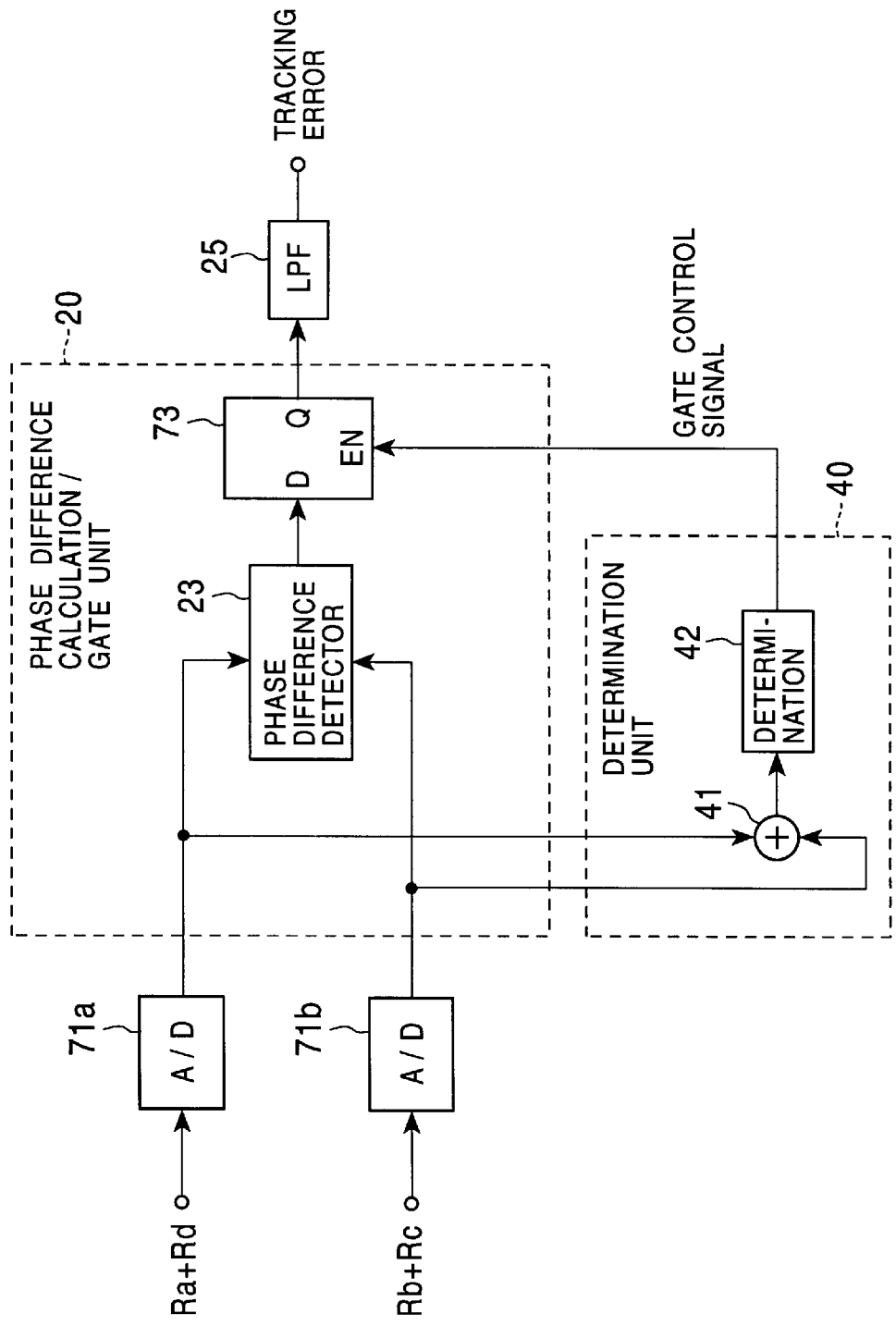

TRACKING ERROR GENERATING DEVICE

BACKGROUND OF THE INVENTION

1. Field of the Invention

The present invention relates generally to a tracking error generating device and, more particularly, to a tracking error generating device for use in a reproducing apparatus for reproducing an optical disc.

2. Description of the Related Art

As tracking methods suitabe for optical disc players, a variety of methods have been employed, including a differential phase detection (DPD) method, a 3-beams method, a push-pull method, and so on. Since the differential phase detection method is capable of providing a tracking error signal even at higher track density as compared with the 3-beams method and the push-pull method, it has recently been employed in the DVD (Digital Versatile Disc or Digital Video Disc) players.

When recording digital information data on the optical disc, the information data is generally modulated using an RLL (Run Length Limited) coding and the coded information data is recorded on the optical disc in the form of marks (or spaces) of different length. In the DVD recording, for example, recording marks having a variety of lengths ranging from 3T (where T indicates a channel clock period) to 11T using an 8/16 modulation. It is however expected that the minimum pit length and hence amplitude of reproduced signal form the pits decreases with the evolution of higher density recording of the optical disc. Therefore, a problem will arise that the tracking performance in the phase differential detection method deteriorates owing to the decrease of the amplitude of reproduced signal.

FIG. 1 schematically illustrates an exemplary configuration of a tracking error generating device according to a conventional phase difference detection method. Referring specifically to FIG. 1, a quadruple detector 11 is composed of four light receiving elements (i.e., A, B, C and D) that are divided by a boundary parallel to a tangential direction of a recording track and a boundary orthogonal to the tangential direction. Within the quadruple detector 11, output signals Ra, Rd from a pair of the diagonally positioned light receiving elements A, D are summed by an adder 21, while output signals Rb, Rc of a pair of diagonally positioned light receiving elements B, Care summed by an adder 22. The resultant sum signals are supplied to a phase difference detector 23. The phase difference detector 23 detects a phase difference Δt between these two sum signals (Rat+Rd) and (Rb+Rc) . The phase difference signal output from the phase difference detector 23 is smoothed in a low pass filter (LPF) 25 which consequently generates at its output terminal a tracking error signal having a voltage proportional to the phase difference.

Another example of a method for obtaining a phase difference as described above is as follows. The quadruple detector detects a phase difference between respective output signals of light receiving elements A and B opposing each other with respect to a boundary parallel to the tangential direction of a recording track, and a phase difference between respective output signals of light receiving elements C and D in a similar positional relationship, respectively. Then, the phase difference calculating circuit calculates the difference between the two phase differences thus detected. The calculated difference is used as a phase difference signal.

A further example of such a method for obtaining a phase difference is as follows. The quadruple detector detects four signals each indicative of a phase difference between a sum signal (Ra+Rb+Rc+Rd), which is the sum of respective output signals of four light receiving elements, and each of the output signals Ra, Rb, Rc, Rd of the four light receiving elements. Then, the phase difference calculating circuit sums the phase differences of outputs in each of two sets of light receiving elements disposed at diagonal positions, and subtracts one addition result from the other. The calculated difference is used as a phase difference signal.

Conventional tracking error generating devices as mentioned above have a problem in correctly detecting the phase difference for short recording pits as a line recording density of an optical disc is increased, thus failing to generate a correct tracking error signal.

FIGS. 2A and 2B are waveform charts for schematically showing output signals a1, a2 from light receiving elements which are input to a phase difference detector 23, and a phase difference between these output signals a1, a2. For example, a1 corresponds to (Ra+Rd); and a2 to (Rb+Rc) in FIG. 1.

FIG. 2A illustrates output signals of light receiving elements when long marks (or spaces) are being tracked. In this event, the output signals of the light receiving elements have suffiently large amplitudes and wide time widths between zero cross points, so that the phase difference can be correctly detected as a time difference between zero cross points of the respective signals. On the others hands, when short marks (or spaces) are being tracked as illustrated in FIG. 2B, the output signals of the light receiving elements have small amplitudes and narrow time widths between zero cross points, so that zero cross points cannot be reliably detected. Furthermore, in some cases, the output signals may not cross the zero level. Thus, the conventional tracking error generating device has a problem in that it cannot correctly detect the phase difference in some cases, and therefore fails to generate a correct and accurate tracking error signal.

OBJECT AND SUMMARY OF THE INVENTION

The present invention has been made in view of the problem mentioned above, and its object is to provide a tracking error generating device according to the phase difference detection method which is capable of correctly detecting a phase difference to generate a normal tracking error signal even when tracking short recording marks (or spaces) on an optical disc resulting from an increased line recording density.

The present invention provides a tracking error generating device which comprises a light receiving unit including a plurality of light receiving elements for receiving light beam irradiated to and reflected off a recording surface of an optical disc, a phase difference detector circuit for generating a phase difference signal indicative of a difference in phase between respective output signals of the light receiving elements; a smoothing circuit for smoothing the phase difference signal to generate a tracking error signal, wherein the respective output signals of the light receiving elements are subjected to predetermined addition processing, and the processed signals or the respective output signals of the light receiving elements being used as evaluation target signals which are to be evaluated, a determination circuit for determining whether each of the evaluation target signals has a sufficiently large amplitude or time width to generate a tracking error signal, and a selective phase difference supplying circuit for selectively supplying the phase difference signal to the smoothing circuit based on a determination result of the determination circuit.

BRIEF DESCRIPTION OF THE DRAWINGS

FIG. 9 is a block diagram illustrating another example of the phase difference calculation/gate unit for use in the tracking error generating device according to the present invention;

FIG. 10 is a block diagram illustrating a further example of the phase difference calculation/gate unit for use in the tracking error generating device according to the present invention;

FIG. 11 is a block diagram illustrating other examples of the phase difference calculation/gate unit and a determination unit 40 for use in the tracking error generating device according to the present invention;

DETAILED DESCRIPTION OF THE PREFERRED EMBODIMENTS

Figure 1:
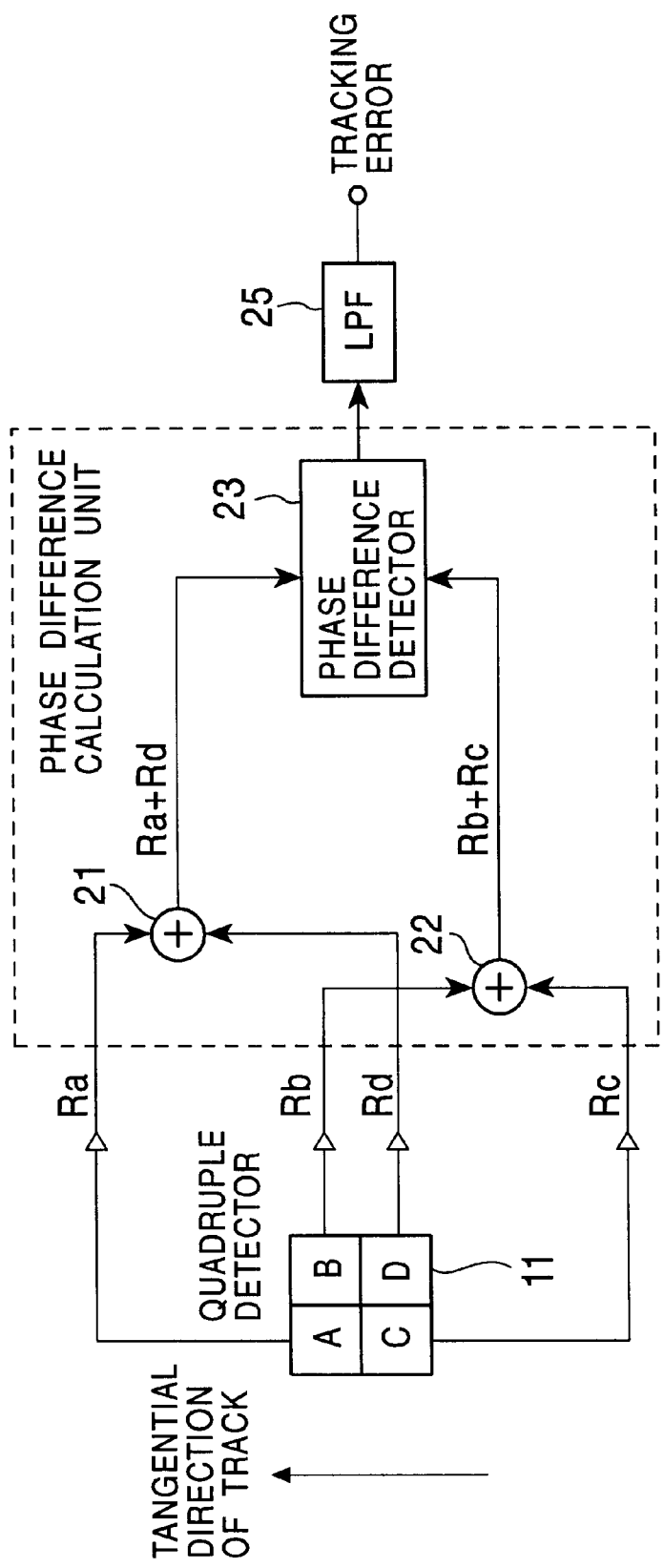
FIG. 1 is a block diagram schematically illustrating an exemplary configuration of a conventional tracking error generating device according to a phase difference detection method.
Figure 2:
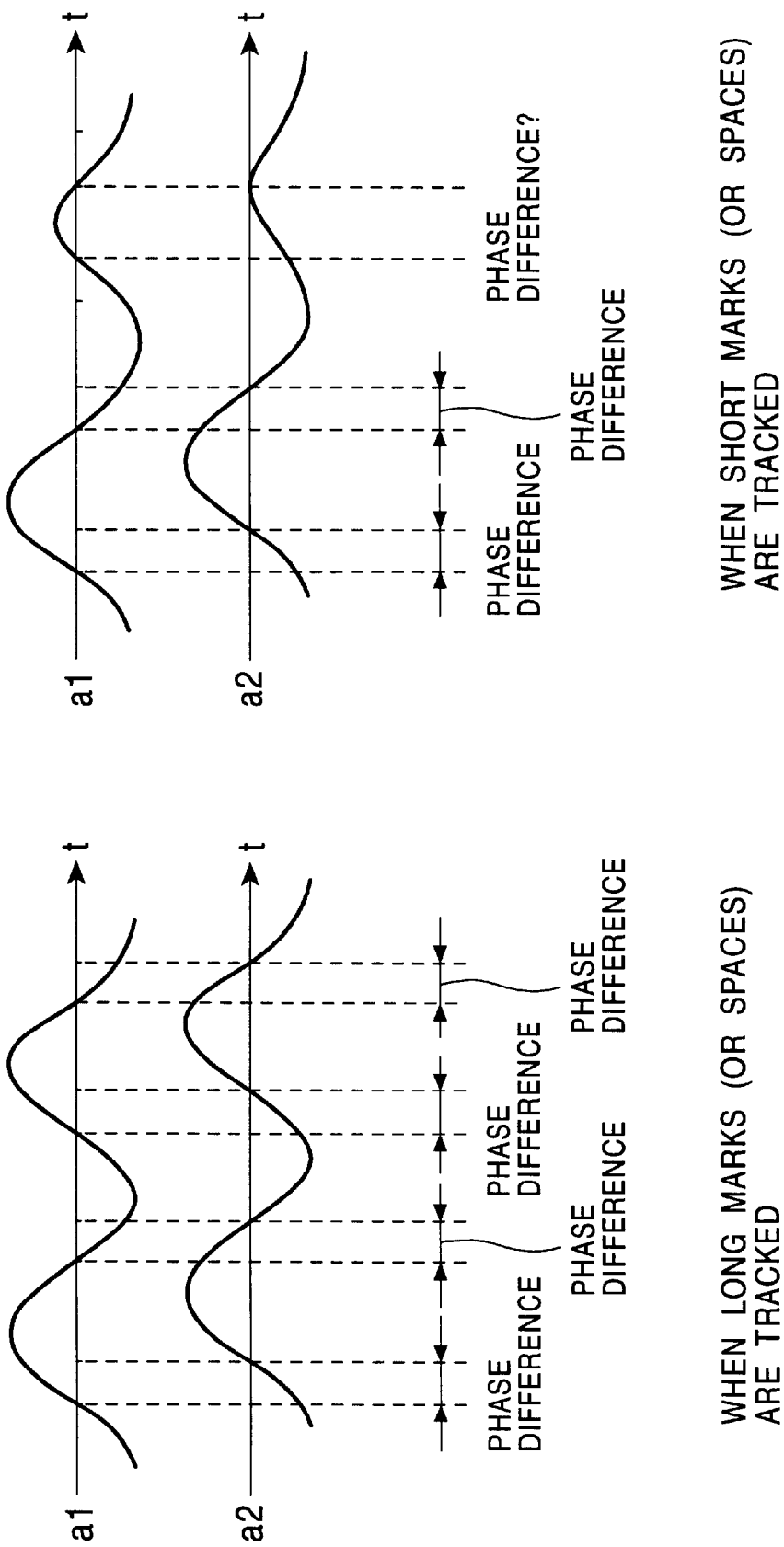
FIGS. 2A and 2B are waveform charts for schematically showing output signals to be input from light receiving elements to a phase difference detector, and phase differences between the output signals.

Various embodiments of the present invention will hereinafter be described in detail with reference to the accompanying drawings. In the drawings described below, substantially equivalent portions are designated by the same reference numerals.

Figure 3:
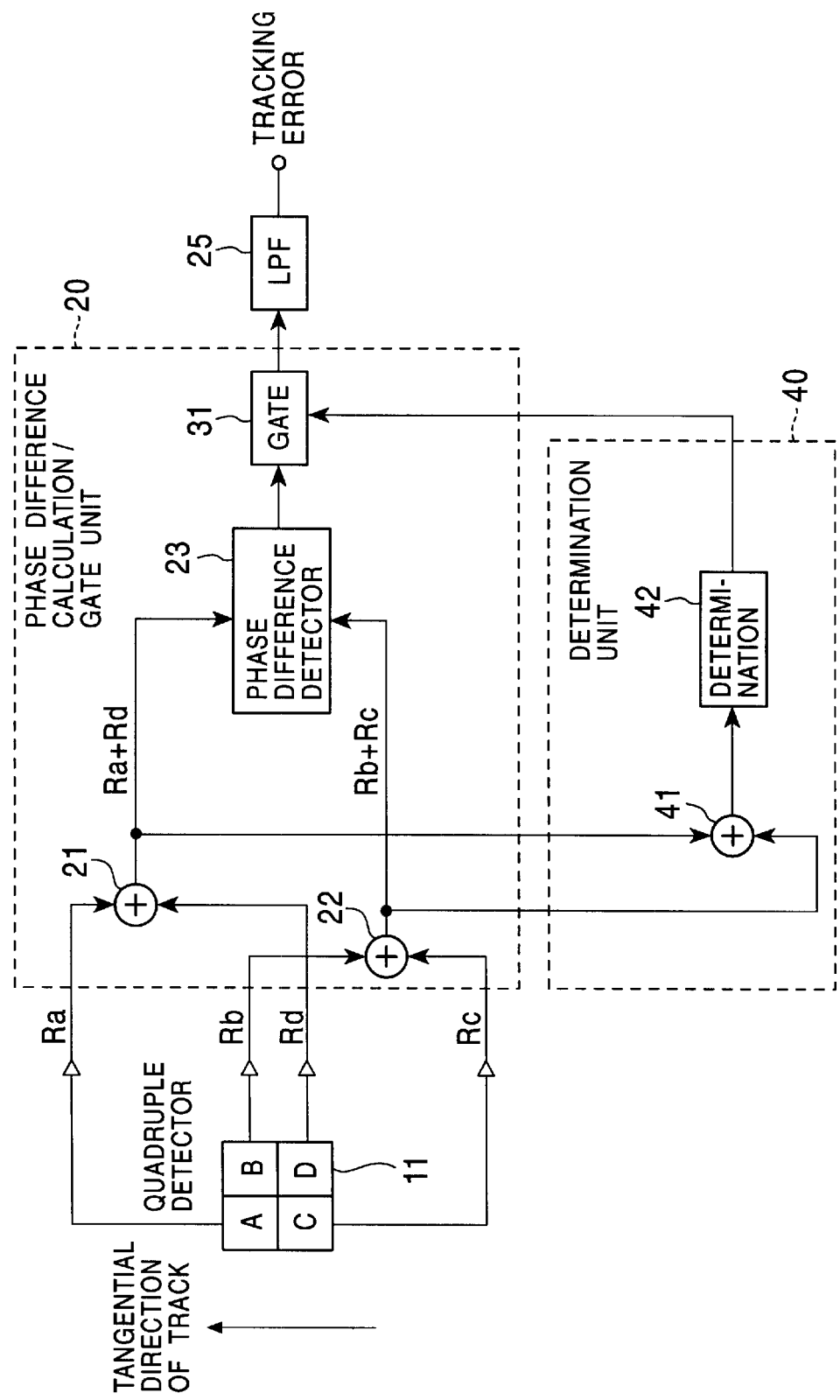
FIG. 3 is a block diagram illustrating the configuration of a tracking error generating device for an optical disc player which constitutes a first embodiment of the present invention.

FIG. 3 is a block diagram illustrating the configuration of a tracking error signal generating device for an optical disc player which constitutes a first embodiment of the present invention. Referring specifically to FIG. 3, a quadruple detector 11 for receiving reflected light from a recording surface of an optical disc (not shown) has four light receiving elements 11A–11D which are positioned respectively in regions defined by dividing the quadruple detector 11 in a tangential direction of a recording track on the optical disc and in the direction orthogonal to the tangential direction. The four light receiving elements 11A–11D transduce reflected light received thereby into electrical signals which are output as read signals Ra–Rd, respectively.

In a phase difference calculation/gate unit 20, an adder 21 sums the read signals Ra, Rd supplied from the light receiving elements 11A, 11D, respectively, to generate a sum signal (Ra+Rd). The sum signal is supplied to a phase difference detector 23. An adder 22 sums the read signals Rb, Rc supplied from the light receiving elements 11B, 11C, respectively to generate a sum signal (Rb+Rc). The sum signal is also supplied to the phase difference detector 23. The phase difference detector 23 detects a phase difference between these two sum signals and supplies a gate circuit 31 with the detected phase difference as a phase difference signal.

An adder 41 in a determination unit 40, in turn, sums the sum signal (Ra+Rd) supplied from the adder 21 and the sum signal (Rb+Rc) supplied from the adder 22 to generate a sum signal (Ra+Rb+Rc+Rd). The generated sum signal is supplied to a determination circuit 42. The determination circuit 42 delivers to a gate circuit 31 an instruction signal (ENABLE signal) for relaying the phase difference signal from the phase difference detector 23 to a low pass filter (LPF) 25 when it determines that the amplitude or pulse width of the sum signal (Ra+Rb+Rc+Rd) is sufficiently large to detect a phase difference. On the other hand, it delivers to the gate circuit 31 an instruction signal (DISABLE signal) for prohibiting the transfer of the phase difference signal when it determines that the amplitude of the sum signal (Ra+Rb+Rc+Rd) is not sufficient for the detection of a phase difference. The gate circuit 31 relays the phase difference signal from the phase difference detector 23 to the LPF 25 when it receives the ENABLE signal from the determination circuit 42. The LPF 25 provides smoothing for the phase difference signal to generate a tracking error signal.

Figure 4:
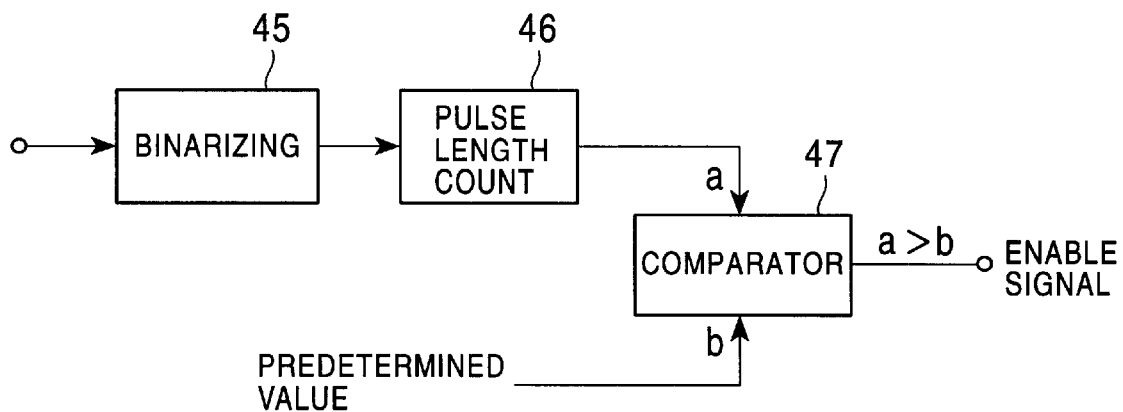
FIG. 4 is a block diagram illustrating an example of a determination circuit for use in the tracking error generating device according to the present invention.

FIG. 4 is a block diagram illustrating an example of an determination circuit 42 for use in the tracking error generating device according to the present invention illustrated in FIG. 3.

Generally, in an optical disc, amplitude of a reproduced signal is decreased as the length of a recording mark (or a space) is decreased. Thus, the amplitude can be determined by detecting the length (or the pattern) of a binarized reproduced signal to evaluate the length (or the pattern) of recording marks (or spaces) without the need for directly detecting the amplitude.

In the embodiment, as illustrated in FIG. 4, the gum signal from the adder 41 is binarized in a binarizing circuit 45 on the basis of a predetermined threshold, and the binarizing circuit 45 supplies the binarized signal to a pulse length count circuit 46. The pulse length count circuit 46 counts the pulse length of the binarized signal, and supplies the resultant pulse length (a) to a comparator circuit 47. The comparator circuit 47 compares the pulse length (a) of the binarized signal with a pulse length (b) having a predetermined value. The predetermined value may be, for example, 2T (where T indicates a channel clock period) when the 8/16 modulation is employed since the shortest possible pit (or space) has a length of 3T. The comparator circuit 47 determines that the read signal has a sufficient pulse width or amplitude to detect a phase difference when the pulse length of the binarized signal is larger than the predetermined pulse length (b), and accordingly delivers an ENABLE signal to the gate circuit 31. On the contrary, the comparator circuit 47 delivers a DISABLE signal to the gate circuit 31 when the pulse length (a) is smaller than or equal to the pulse length (b). Alternatively, the ENABLE signal may be provided when the pulse length lies within a predetermined range.

Figure 5:
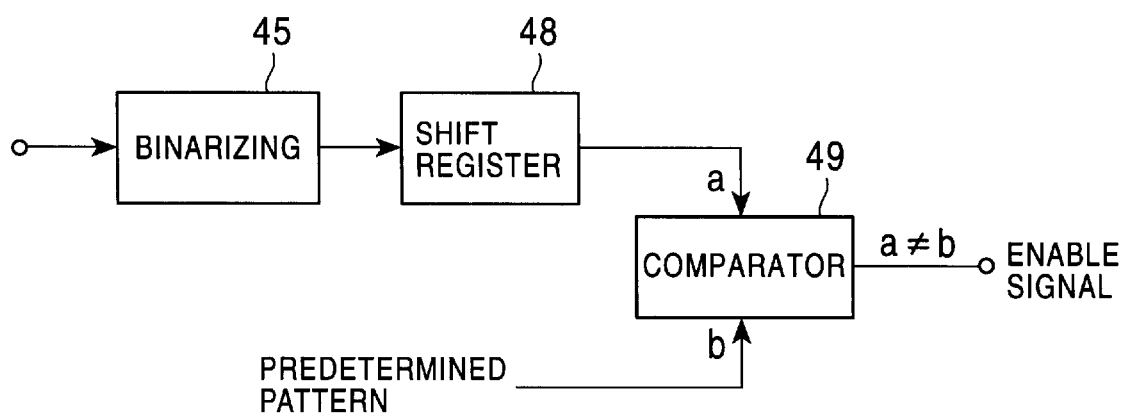
FIG. 5 is a block diagram illustrating another example of the determination circuit according to the present invention.

FIG. 5 is a block diagram illustrating another example of the determination circuit 42 according to the present invention.

Referring specifically to FIG. 5, a sum signal from the adder 41 is binarized in a binarizing circuit 45 on the basis of a predetermined threshold, and the binarizing circuit 45 supplies the binarized signal to a shift register 48. The shift register 48 performs a serial-to-parallel conversion of the binarized signal, and supplies the converted read signal to a comparator circuit 49. The comparator circuit 49 compares every predetermined pulse train in a pulse pattern (a) of the parallel converted read signal with a predetermined pattern (b). For the predetermined pattern (b), a pattern sequence having a sequence of shortest marks, for example, may be used since it is relied on as the criteria for determining whether or not the read signal has a sufficient pulse width or amplitude to detect a phase difference. Alternatively, a plurality of predetermined patterns (b) may be provided. The pattern comparator circuit 49 determines that the read signal has a sufficient pulse width or amplitude to detect a phase difference when the pulse pattern (a) of the binarized signal does not match any part of the predetermined pattern (b), and delivers an ENABLE signal to the gate circuit 31. Conversely, the pattern comparator circuit 49 determines that the read signal does not have a sufficient amplitude to detect a phase difference when the pulse pattern (a) of the binarized read signal matches any part of the predetermined pattern (b), and delivers a DISABLE signal to the gate circuit 31. In the above example, a pattern sequence having a sequence of shortest marks is used as the predetermined pattern (b), and a read signal is determined to have a sufficient pulse width or amplitude to detect a phase difference when a pulse pattern (a) the binarized read signal does not match any part of the predetermined pattern (b). Contrary to this, a predetermined pattern (b) having a sufficient pulse width may be used such that a read signal is determined to have a sufficient pulse width or amplitude when a pulse pattern (a) of the binarized read signal matches any part of the predetermined pattern (b).

Figure 6:
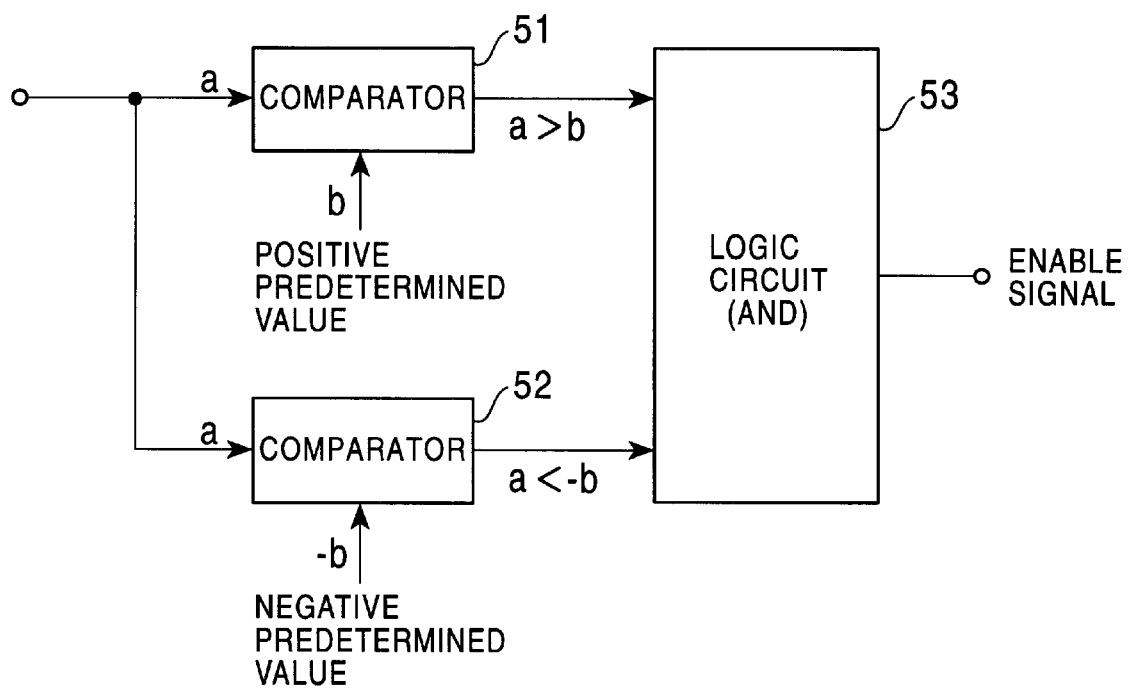
FIG. 6 is a block diagram illustrating a further example of the determination circuit according to the present invention.

FIG. 6 is a block diagram illustrating a further example of the determination circuit 42 according to the present invention.

Referring specifically to FIG. 6, a sum signal from the adder 41 is supplied to a comparator circuit 51 and to a comparator circuit 52. The comparator circuit 51 compares the amplitude (a) of the read signal with a positive predetermined value (b), and supplies a logic circuit 53 with a logic signal representative of "true" when the amplitude is equal to or larger than the predetermined value (b), and with a logic signal representative of "false" when the amplitude is smaller than the predetermined value (b). The comparator circuit 52 in turn compares the amplitude (a) of the read signal with a negative predetermined value (−b), and supplies the logic circuit 53 with a logic signal representative of "true" when the amplitude is equal to or smaller than the predetermined value (−b) and with a logic signal representative of "false" when the amplitude is larger than the predetermined value (−b).

Figure 7A:
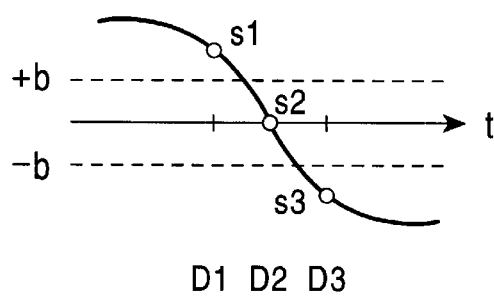
FIGS. 7A and 7B are schematic diagrams for showing the operation of the determination circuit illustrated in FIG. 6.
Figure 7B:
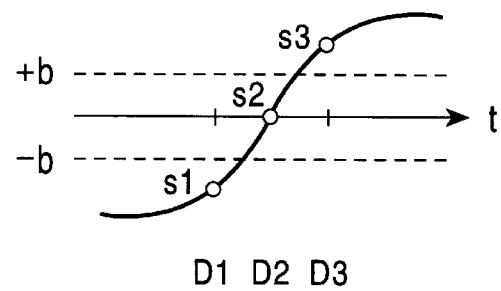

As illustrated in FIG. 7, a read signal is compared at predetermined times D1, D3 with respect a zero cross point D2 in the comparator circuit 51 and the comparator circuit 52, respectively. The logic circuit 53 performs a logic AND operation on the logic signals from the comparator circuit 51 and the comparator circuit 52, respectively, and delivers an ENABLE signal to the gate circuit 31 only when both the logic signals are "true," and otherwise delivers a DISABLE signal to the gate circuit 31. More specifically, as illustrated in FIG. 7A, when an amplitude si at D is larger than the positive predetermined value (b) at D1 in the comparator circuit 51, and an amplitude 93 is smaller than the negative predetermined value (−b) at D3 in the comparator circuit 52, the logic circuit 53 delivers an ENABLE signal to the gate circuit 31. Also, as illustrated in FIG. 7B, when an amplitude sl is smaller than the negative predetermined value (−b) at D1 in the comparator circuit 52, and an amplitude s3 is larger than the positive predetermined value (b) at D3 in the comparator circuit 51, the logic circuit 53 delivers an ENABLE signal to the gate circuit 31. Otherwise, the logic circuit 53 delivers a DISABLE signal to the gate circuit 31.

While the above description has been given for an example in which the determination circuit 42 determines whether sum signals have an amplitude level higher than a predetermined value, the same principle may be applied to a single read signal.

Figure 8:
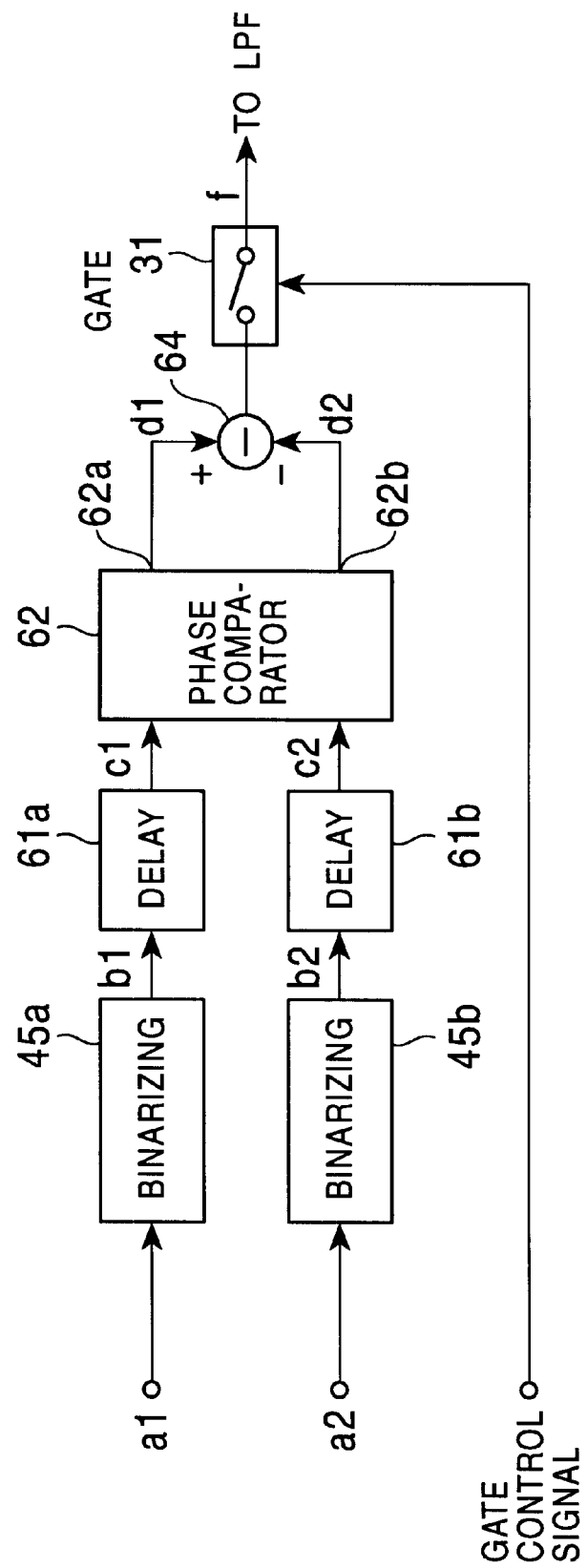
FIG. 8 is a block diagram illustrating an example of a phase difference calculation/gate unit for use in the tracking error generating device according to the present invention.

FIG. 8 is a block diagram illustrating an example of the phase difference calculation/gate unit 20 for use in the tracking error generating device according to the present invention illustrated in FIG. 3.

Referring specifically to FIG. 8, a read signal a1 (=Ra+Rd) from the adder 21 is supplied to a binarizing circuit 45a. The binarizing circuit 45a binarizes the read signal a1 on the basis of a predetermined threshold, and supplies the binarized signal b1 to a delay circuit 61a. The delay circuit 61a delays the binarized signal b1 in accordance with the timing at which a gate control signal from the determination circuit 42 is supplied to the gate circuit 31, and supplies a delayed signal c1 thus generated to a phase comparator circuit 62. Similarly, a read signal a2 (=Rb+Rc) from the adder 22 is supplied to a binarizing circuit 45b. The binarizing circuit 45b binarizes the read signal a2 on the basis of a predetermined threshold, and supplies the binarized signal b2 to a delay circuit 61b. The delay circuit 61b delays the binarized signal b2 in accordance with the timing at which a gate control signal from the determination circuit 42 is supplied to the gate circuit 31, and supplies a delayed signal c2 thus generated to the phase comparator circuit 62. The phase comparator circuit 62 compares the delayed signals c1 and c2 from the delay circuits 61a and 61b in terms of the phase. The phase comparator circuit 62, then, outputs a lead signal d1 to a lead signal output terminal 62a when the delayed signal c1 leads to the delayed signal c2, and a lag signal d2 to a lag signal output terminal 62b when the delayed signal c1 lags behind the delayed signal c2. The lead signal d1 and the lag signal d2 are supplied to a subtractor 64. The subtractor 64 subtracts the lag signal d2 from the lead signal d1 to generate a difference signal. The difference signal is supplied to the gate circuit 31 as a phase difference signal f. The gate circuit 31 relays the phase difference signal f to the LPF 25 on the basis of a gate control signal from the determination circuit 42.

FIG. 9 is a block diagram illustrating another example of the phase difference calculation/gate unit 20 for use in the tracking error generating device according to the present invention illustrated in FIG. 3. The phase difference calculation/gate unit 20 differs from that of FIG. 8 in that a gate circuit 31 is positioned between a delay circuit 61b and a phase comparator circuit 62.

Referring specifically to FIG. 9, the phase comparator circuit 62 has one input terminal connected to an output terminal of a delay circuit 61a, and the other input terminal connected to the gate circuit 31. The gate circuit 31 is responsive to a gate control signal from the determination circuit 42 to connect the other input terminal of the phase comparator circuit 62 to the output terminal of the delay circuit 61b when it receives an ENABLE signal. In this event, the phase comparator circuit 62 compares delayed signals c1 and c2 supplied from the delay circuit 61a and the delay circuit 61b, respectively, in terms of the phase. The phase comparator circuit 62, then, outputs a lead signal d1 to a lead signal output terminal 62a when the delayed signal c1 leads to the delayed signal c2, and a lag signal d2 to a lag signal output terminal 62b when the delayed signal c1 lags behind the delayed signal c2. The lead signal d1 and the lag signal d2 are supplied to a subtractor 64. The subtractor 64 subtracts the lag signal d2 from the lead signal d1 to produce a difference signal. The difference signal is supplied to the LPF 25 as a phase difference signal f. On the other hand, when the gate control signal from the determination circuit 42 is a DISABLE signal, the gate circuit 31 connects the other input terminal of the phase comparator circuit 62 to the output terminal of the delay circuit 61a. In this event, since the phase comparator circuit 62 is supplied at both of the input terminals thereof with the same delayed signal c1 from the delay circuit 61a, the resultant phase difference becomes zero, thereby making it possible to substantially prevent the subtractor 64 from outputting the signal indicating a phase difference.

FIG. 10 illustrates a further example of the phase difference calculation/gate unit 20 for use in the tracking error generating device according to the present invention illustrated in FIG. 3. The phase difference calculation/gate unit 20 differs from that of FIG. 8, in a first aspect, in that a delay circuit 61a and a delay circuit 61b are positioned behind a phase comparator circuit 62 such that a lead signal c1 and a lag signal c2 are delayed after a phase comparison is performed. In a second aspect, the unit 20 of FIG. 10 differs from that of FIG. 8 in that AND circuits 65a and 65b are employed as the gate circuit 31. Delayed signals d1 and d2, which are the delayed lead signal c1 and the delayed lag signal c2, are supplied to the AND gate 65a and 65b, respectively, which execute a logic AND operation on the delayed signals a2 and d2 with a gate control signal, respectively. The delayed signals d1 and d2 are supplied to a subtractor 64 only when the gate control signal is an ENABLE signal. Alternatively, the delay circuits and the AND circuits may be disposed before the phase comparator circuit 62.

FIG. 11 is a block diagram illustrating other examples of the phase difference calculation/gate unit 20 and the determination unit 40 for use in the tracking error generating device according to the present invention illustrated in FIG. 3. Referring specifically to FIG. 11, a sum signal (Ra+Rd) and a sum signal (Rb+Rc) are converted to digital signals in A/D (analogue-to-digital) converters 71a and 71b, respectively, and supplied to a phase difference detector 23. The phase difference detector 23 detects a difference in phase between these two sum signals, and provides a gate circuit 73 with the detected phase difference as a phase difference signal. An adder 41, in turn, sums the digital signals converted from the sum signal (Ra+Rd) and the sum signal (Rb+Rc) in the A/D converters 71a and 71b, respectively, and supplies the resultant sum to a determination circuit 42. The determination circuit 42 delivers to a gate circuit 73 a gate control signal ("1") for relaying an input signal when it determines that the magnitude of the digital signal (Ra+Rb+Rc+Rd) is larger than a predetermined value, and delivers to the gate circuit 73 a gate control signal "0" when the magnitude of the digital signal (Ra+Rb+Rc+Rd) is smaller than the predetermined value. The gate circuit 73 may be implemented by a D flip-flop which outputs an input D to an output Q as a phase difference signal when a gate control signal, i.e., an EN input is "1" and supplies the phase difference signal to an LPF 25. Conversely, when the EN input is "0," the previous output is held in the gate circuit 73 irrespective of the input D, so that no phase difference signal is output.

Figure 12:
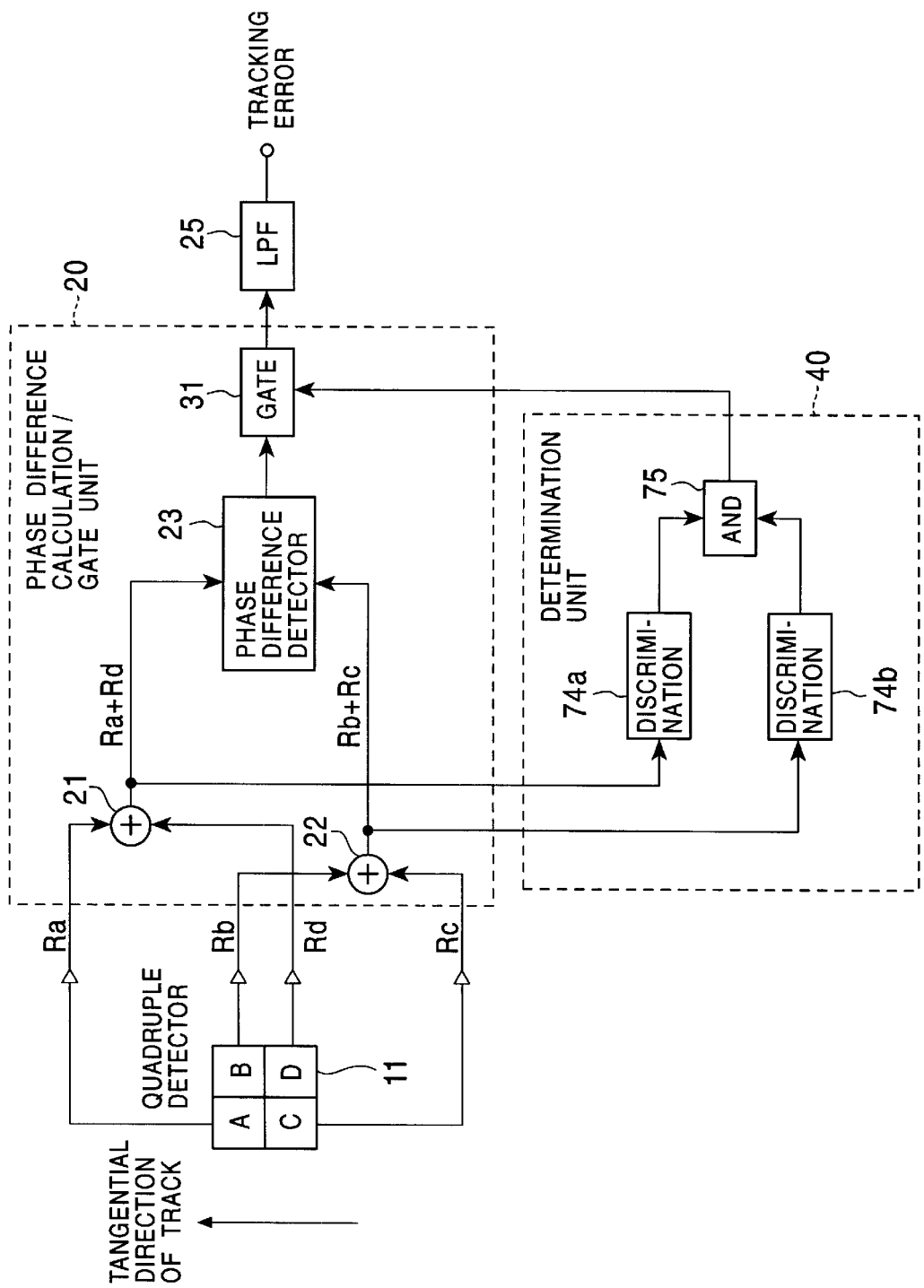
FIG. 12 is a block diagram illustrating the configuration of a tracking error generating device for an optical disc player which constitutes a second embodiment of the present invention.

FIG. 12 is a block diagram illustrating the configuration of a tracking error generating device for an optical disc player which constitutes a second embodiment of the present invention.

The second embodiment differs from the first embodiment illustrated in FIG. 3 in that the first embodiment sums the sum signal (Ra+Rd) from the adder 21 and the sum signal (Rb+Rc) from the adder 22 in the adder 41 before evaluation is performed, whereas the second embodiment employs discrimination circuits 74a and 74b, each of which generates a logic signal indicating that the magnitude of the sum signal (Ra+Rd) or (Rb+Rc) exceeds a predetermined level, and the logic signals of the discrimination circuits 74a and 74b are supplied to a logic circuit 75 which performs a logic AND operation on the logic signals. Thus, the logic circuit 75 delivers an ENABLE signal to a gate circuit 31 only when the magnitudes of both the sum signals (Ra+Rd) and (Rb+Rc) exceed the predetermined level, and otherwise delivers a DISABLE signal to the gate circuit 31.

Figure 13:
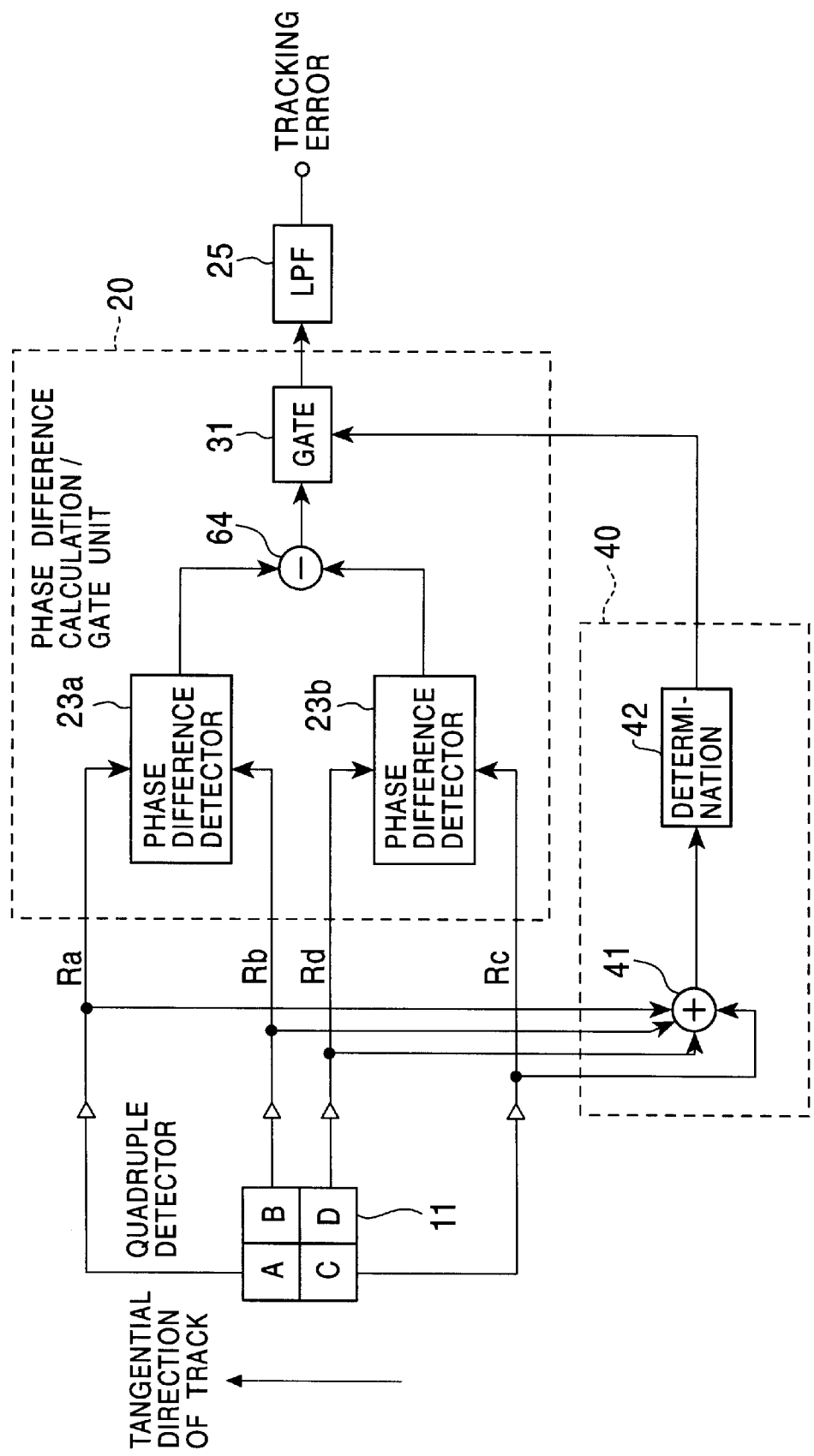
FIG. 13 is a block diagram illustrating the configuration of a tracking error generating device for an optical disc player which constitutes a third embodiment of the present invention.

FIG. 13 is a block diagram illustrating the configuration of a tracking error generating device for an optical disc player which constitutes a third embodiment of the present invention.

The third embodiment differs from the first embodiment illustrated in FIG. 3 and the second embodiment illustrated in FIG. 12 in that the first and second embodiments sum read signals from diagonally positioned light receiving elements in the adder 21 and the adder 22, respectively, and subject the resultant sum signals (Ra+Rd) and (Rb+Rc) to phase difference detection, whereas the third embodiment subjects phase difference detection to each of read signals Ra, Rb, Rc, Rd, as illustrated in FIG. 13. Also, the determination is made on the sum of the respective read signals (Ra+Rb+Rc+Rd).

Figure 14:
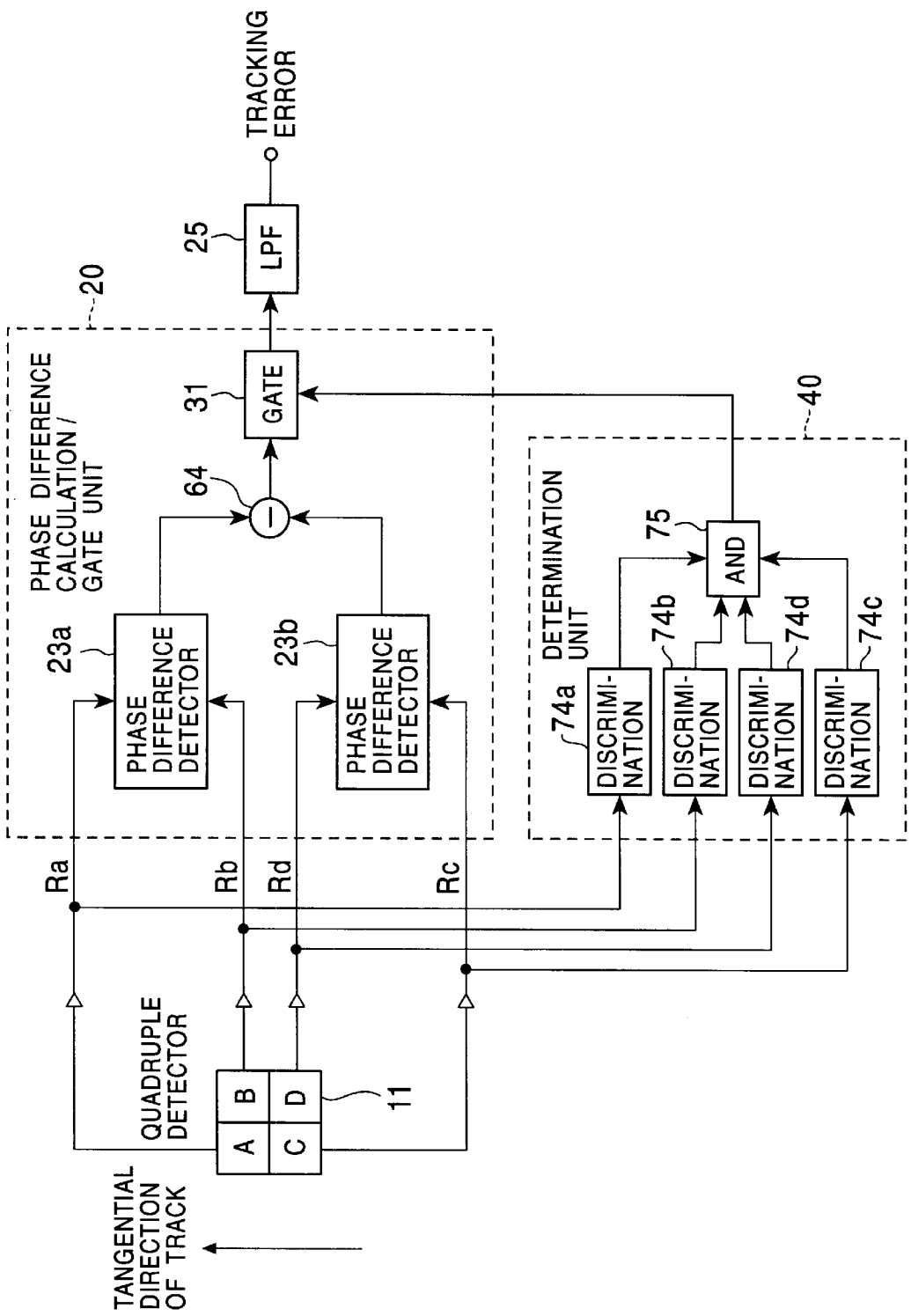
FIG. 14 is a block diagram illustrating the configuration of a tracking error generating device for an optical disc player which constitutes a fourth embodiment of the present invention.

FIG. 14 is a block diagram illustrating the configuration of a tracking error generating device for an optical disc player which constitutes a fourth embodiment of the present invention.

The fourth embodiment differs from the third embodiment illustrated in FIG. 13 in that the fourth embodiment employs discrimination circuits 74a, 74b, 74c, 74d, each of which generates a logic signal indicating that the magnitude of an associated one of read signals Ra, Rb, Rc, Rd exceeds a predetermined level, and the logic signals from these discrimination circuits 74a–74d are supplied to a logic circuit 75 which performs a logic AND operation on the logic signals. Thus, the logic circuit 75 delivers an ENABLE signal to a gate circuit 31 only when the magnitude of each read signal Ra, Rb, Rc, Rd exceeds the predetermined level, and otherwise delivers a DISABLE signal to the gate circuit 31.

Figure 15:
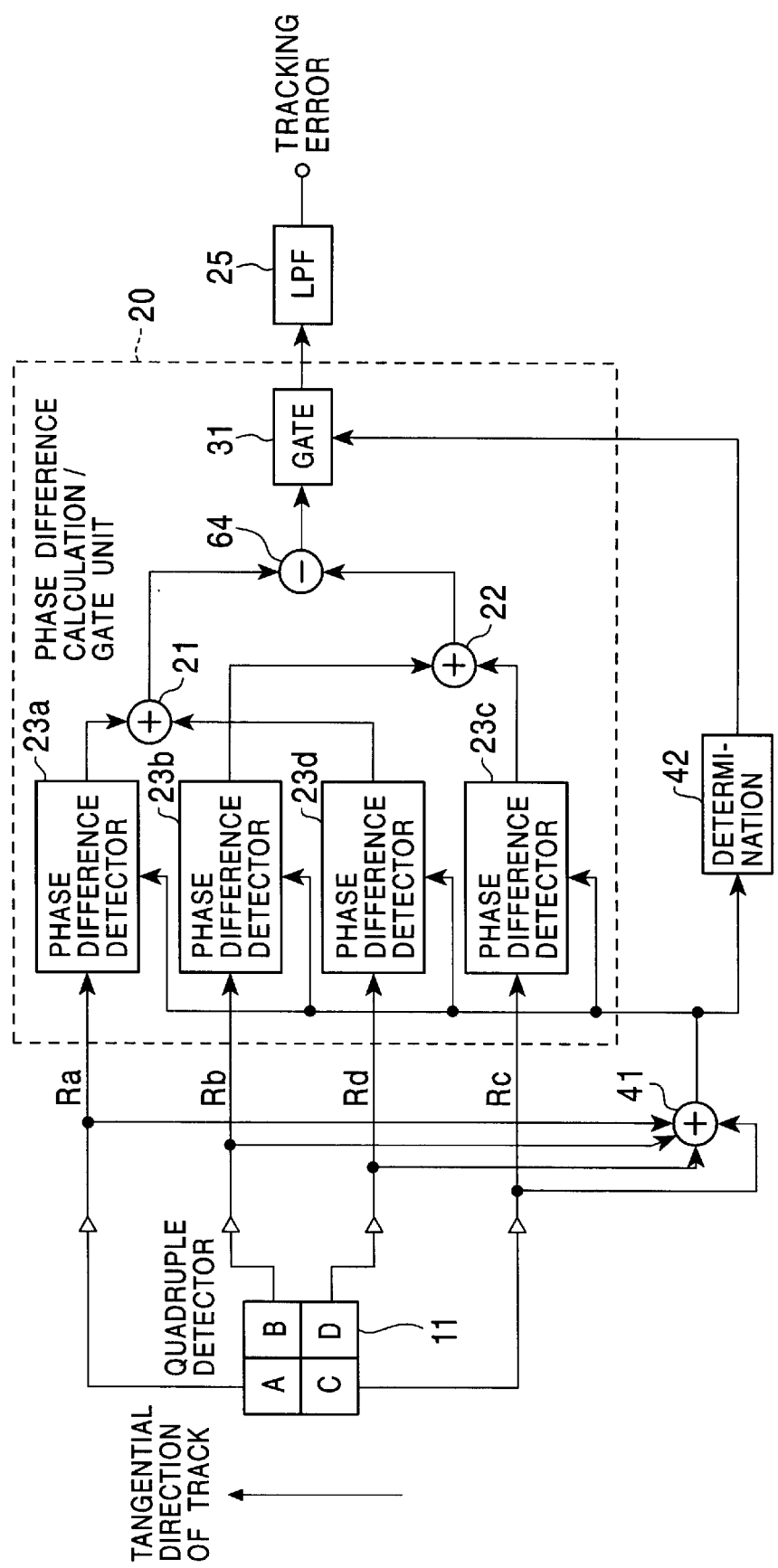
FIG. 15 is a block diagram illustrating the configuration of a tracking error generating device for an optical disc player which constitutes a fifth embodiment of the present invention.

FIG. 15 is a block diagram illustrating the configuration of a tracking error generating device for an optical disc player which constitutes a fifth embodiment of the present invention.

The fifth embodiment differs from the foregoing first to fourth embodiments in that the fifth embodiment detects differences in phase between read signals Ra, Rb, Rc, Rd and the sum of the read signals (Ra+Rb+Rc+Rd), as illustrated in FIG. 15. Also, in the fifth embodiment, the determination is made on the sum of the read signals (Ra+Rb+Rc+Rd).

Figure 16:
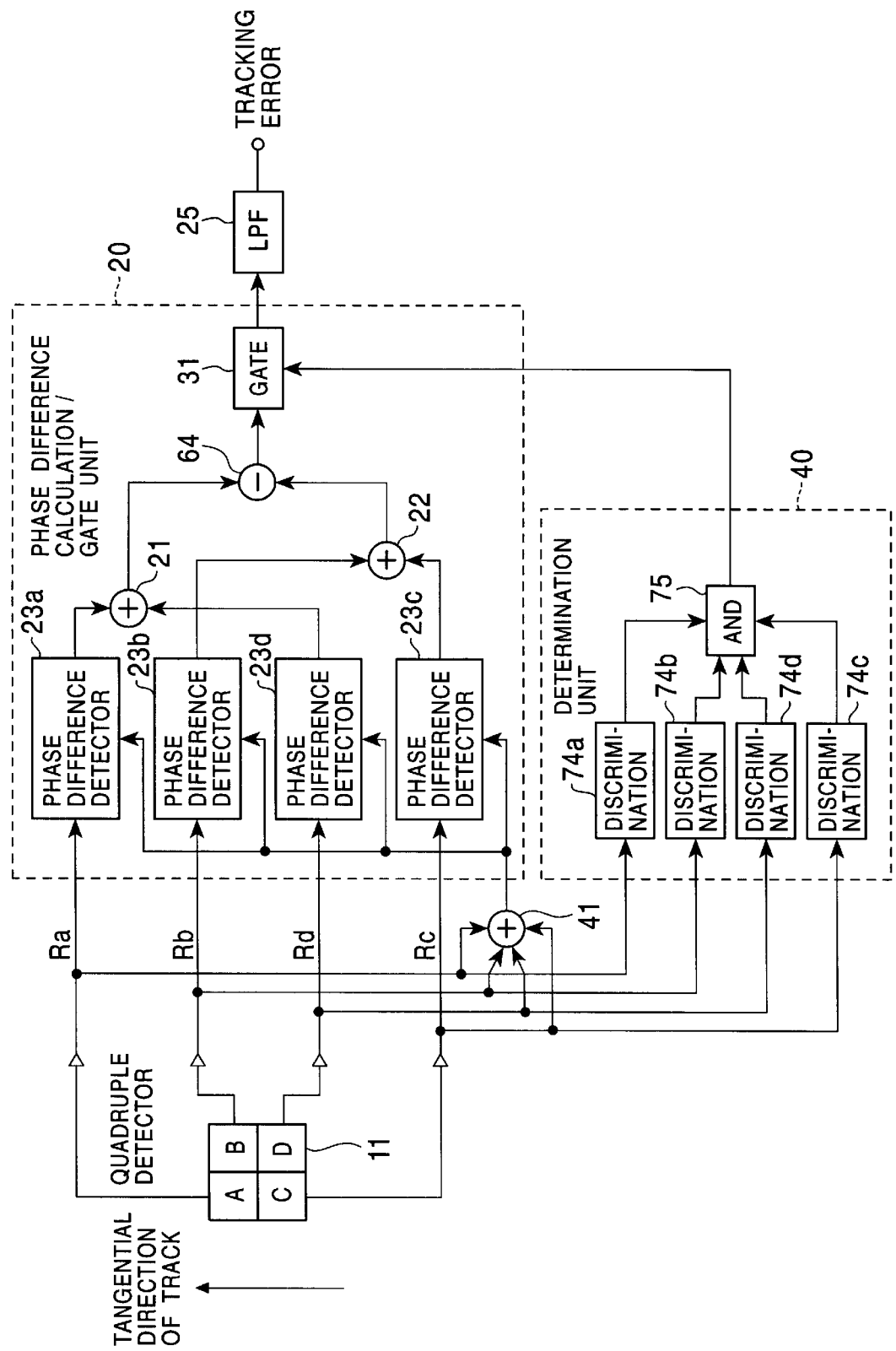
FIG. 16 is a block diagram illustrating the configuration of a tracking error generating device for an optical disc player which constitutes a sixth embodiment of the present invention.

FIG. 16 is a block diagram illustrating the configuration of a tracking error generating device for an optical disc player which constitutes a sixth embodiment of the present invention.

While the sixth embodiment also detects differences in phase between read signals Ra, Rb, Rc, Rd and the sum of the read signals (Ra+Rb+Rc+Rd) in a manner similar to the fifth embodiment, the sixth embodiment differs from the fifth embodiment in that the sixth embodiment employs discrimination circuits 74a, 74b, 74c, 74d, each of which generates a logic signal indicating that the magnitude of an associated read signal Ra, Rb, Rc or Rd exceeds a predetermined level, as illustrated in FIG. 16. The logic signals from these discrimination circuits 74a–74d are supplied to a logic circuit 75 which performs a logic AND operation on these logic signals. Thus, the logic circuit 75 delivers an ENABLE signal to a gate circuit 31 only when the magnitude of each read signal Ra, Rb, Rc, Rd exceeds the predetermined level, and otherwise delivers a DISABLE signal to the gate circuit 31.

As described above, according to the present invention, a phase difference is detected only for a read signal having a large amplitude or pulse width to provide for correct detection of the phase difference even when recording marks (or spaces) having short lengths are recorded on an optical disc for purposes of increasing the recording density or the like, thus making it possible to generate a normal tracking error signal.

More specifically, as the recording density is higher, the length of the shortest mark (or space) becomes so short that its reproduced amplitude ends up to be insufficient for detecting the phase difference. However, a majority of other (relatively long) recording marks (or spaces) provides reproduced signals having sufficient amplitudes to detect the phase difference. It is therefore possible to correctly detect the phase difference to generate a normal tracking error signal by excluding signals having amplitudes insufficient for detecting the phase difference and using only signals having amplitudes sufficient for detecting the phase difference.

It should be noted that a variety of determination circuits, phase difference calculation circuit, gate circuits and so on illustrated in the foregoing embodiments may be combined as required.

The present invention has been described with reference to the preferred embodiments thereof. It should be understood by those skilled in the art that a variety of alternations and modifications may be made from the embodiments described above. It is therefore contemplated that the appended claims encompass all such alternations and modifications.

What is claimed is:

1. A tracking error generating device having a light receiving unit including a plurality of light receiving elements for receiving light beam irradiated to and reflected from a recording surface of an optical disc, a phase difference detector circuit for generating a phase difference signal indicative of a difference in phase between respective output signals of said light receiving elements, and a smoothing circuit for smoothing said phase difference signal to generate a tracking error signal, comprising:

a processing circuit for executing a predetermined processing on the respective output signals of said light receiving elements for obtaining evaluation target signals, a determination circuit for determining whether each of said evaluation target signals has a sufficiently large amplitude or time width to generate a tracking error signal; and a selective phase difference supplying circuit for selectively supplying said phase difference signal to said smoothing circuit on the basis of a determination result of said determination circuit.

2. A tracking error generating device according to claim 1, wherein the respective output signals of said light receiving elements are used for generating a tracking error signal when said determination circuit determines that said evaluation target signals are sufficient to generate a tracking error signal.

3. A tracking error generating device according to claim 1, wherein said light receiving unit comprises a quadruple detector including four light receiving elements that are positioned respectively in regions defined by dividing said light receiving unit into two along a tangential direction of a recording track of said optical disc and further dividing said light receiving unit into two along a direction orthogonal to the tangential direction of said recording track.

4. A tracking error generating device according to claim 3, wherein said phase difference detector circuit sums respective output signals of the light receiving elements disposed at diagonal positions of said quadruple detector, and employs a signal indicative of a difference in phase between two resultant sum signals as said phase difference signal.

5. A tracking error generating device according to claim 3, wherein said phase difference detector circuit employs as said phase difference signal a differential signal indicative of a difference in phase between output signals of two sets of light receiving elements opposing each other with respect to the direction of said recording track of said quadruple detector.

6. A tracking error generating device according to claim 3, wherein said phase difference detector circuit calculates phase differences between a sum signal derived by summing the respective output signals of said four light receiving elements and each of the output signals of said four light receiving elements, and employs as said phase difference signal a differential signal indicative of a difference in phase between two sum signals each generated by summing phase differences of respective output signals of the light receiving elements disposed at diagonal positions of said quadruple detector.

7. A tracking error generating device according to claim 1, wherein said evaluation target signal is a sum signal generated by summing the respective output signals of said plurality of light receiving elements.

8. A tracking error generating device according to claim 3, wherein said processing circuit sums the respective output signals of the light receiving elements disposed at diagonal positions of said quadruple detector, and wherein said determination circuit includes a discrimination circuit discriminating that the two resultant sum signals each have a sufficiently large amplitude or time width to generate a tracking error signal, and for generating logic signals each indicative of the discrimination results, said determination circuit performing a logic AND operation on said logic signals of said discrimination circuit to provide said determination result.

9. A tracking error generating device according to claim 1, wherein said determination circuit includes a discrimination circuit for discriminating that the respective output signals of said plurality of light receiving elements each have a sufficiently large amplitude or time width to generate a tracking error signal, and for generating logic signals each indicative of the discrimination result, said determination circuit performing a logic AND operation on said logic signals to provide said determination result.

10. A tracking error generating device according to claim 1, wherein:

said determination circuit includes a binarizing circuit for generating binarized signals of said evaluation target signals; and said determination circuit determines that each of said evaluation target signals has a sufficiently large time width to generate a tracking error signal when a pulse length of said binarized signal satisfies a predetermined condition.

11. A tracking error generating device according to claim 1, wherein:

said determination circuit includes a binarizing circuit for generating binarized signals of said plurality of evaluation target signals; and said determination circuit compares a pulse pattern of each of said binarized signals with at least one predetermined pulse patterns, and determines that each of said evaluation target signals has a sufficiently large time width to generate a tracking error signal when said pulse pattern of said binarized signal does not match any of said at least one predetermined pulse patterns.

12. A tracking error generating device having a light receiving unit including a plurality of light receiving elements for receiving light beam irradiated to and reflected from a recording surface of an optical disc, a phase difference detector circuit for generating a phase difference signal indicative of a difference in phase between respective output signals of said light receiving elements, and a smoothing circuit for smoothing said phase difference signal to generate a tracking error signal, comprising:

a determination circuit for determining whether each of the respective output signals of said light receiving elements has a sufficiently large amplitude or time width to generate a tracking error signal; and a selective phase difference supplying circuit for selectively supplying said phase difference signal to said smoothing circuit on the basis of a determination result of said determination circuit.

13. A tracking error generating device according to claim 12, wherein the respective output signals of said light receiving elements are used for generating a tracking error signal when said determination circuit determines that said respective output signals of said light receiving elements are sufficient to generate a tracking error signal.

14. A tracking error generating device according to claim 12, wherein said light receiving unit comprises a quadruple detector including four light receiving elements that are positioned respectively in regions defined by dividing said light receiving unit into two along a tangential direction of a recording track of said optical disc and further dividing said light receiving unit into two along a direction orthogonal to the tangential direction of said recording track.

15. A tracking error generating device according to claim 14, wherein said phase difference detector circuit sums respective output signals of the light receiving elements disposed at diagonal positions of said quadruple detector, and employs a signal indicative of a difference in phase between two resultant sum signals as said phase difference signal.

16. A tracking error generating device according to claim 14, wherein said phase difference detector circuit employs as said phase difference signal a differential signal indicative of a difference in phase between output signals of two sets of light receiving elements opposing each other with respect to the direction of said recording track of said quadruple detector.

17. A tracking error generating device according to claim 14, wherein said phase difference detector circuit calculates phase differences between a sum signal derived by summing the respective output signals of said four light receiving elements and each of the output signals of said four light receiving elements, and employs as said phase difference signal a differential signal indicative of a difference in phase between two sum signals each generated by summing phase differences of respective output signals of the light receiving elements disposed at diagonal positions of said quadruple detector.

18. A tracking error generating device according to claim 12, wherein said determination circuit includes a discrimination circuit for discriminating that the respective output signals of said plurality of light receiving elements each have a sufficiently large amplitude or time width to generate a tracking error signal, and for generating logic signals each indicative of the discrimination result, said determination circuit performing a logic AND operation on said logic signals to provide said determination result.

19. A tracking error generating device according to claim 12, wherein:

said determination circuit includes a binarizing circuit for generating binarized signals of the respective output signals of said plurality of light receiving elements; and said determination circuit determines that each of the respective output signals of said plurality of light receiving elements has a sufficiently large time width to generate a tracking error signal when a pulse length of each binarized signal satisfies a predetermined condition.

20. A tracking error generating device according to claim 1, wherein;

said determination circuit includes a binarizing circuit for generating binarized signals of the respective output signals of said plurality of light receiving elements; and said determination circuit compares a pulse pattern of each of said binarized signals with at least one predetermined pulse patterns, and determines that each of the respective output signals of said plurality of light receiving elements has a sufficiently large time width to generate a tracking error signal when said pulse pattern of said binarized signal does not match any of said at least one predetermined pulse patterns.

* * * * *